United States Patent [19]
Ecclesine

[11] Patent Number: 5,983,275
[45] Date of Patent: *Nov. 9, 1999

[54] APPARATUS FOR AND METHOD OF PROVIDING INTERRUPTS TO A HOST PROCESSOR IN A FRAME RECEIVING SYSTEM

[75] Inventor: Peter Ecclesine, Livermore, Calif.

[73] Assignee: Cirrus Logic, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,357

[22] Filed: Jan. 30, 1996

Related U.S. Application Data

[63] Continuation of application No. 08/316,016, Sep. 30, 1994, abandoned, which is a continuation-in-part of application No. 08/237,984, May 4, 1994, abandoned.

[51] Int. Cl.⁶ .................................................. G06F 13/00
[52] U.S. Cl. ........................ 709/231; 710/260; 710/262
[58] Field of Search ..................... 395/200.61, 200.62, 395/733, 735, 185.08, 200.75, 185.02, 580, 739; 370/389, 473, 229; 340/825.13; 714/49; 709/245, 232, 231; 712/233; 710/266, 260, 262

[56] References Cited

U.S. PATENT DOCUMENTS

| | | | |
|---|---|---|---|
| 5,088,032 | 2/1992 | Bosack | 395/200 |
| 5,117,430 | 5/1992 | Berglund | 370/408 |
| 5,210,749 | 5/1993 | Firoozmand | 370/85.1 |
| 5,237,660 | 8/1993 | Weber et al. | 395/250 |
| 5,247,626 | 9/1993 | Firoozmand | 395/250 |
| 5,274,762 | 12/1993 | Peterson et al. | 395/200.49 |
| 5,299,313 | 3/1994 | Petersen et al. | 395/200 |
| 5,301,275 | 4/1994 | Vanbuskirk et al. | 395/250 |
| 5,307,459 | 4/1994 | Petersen et al. | 395/200 |
| 5,319,752 | 6/1994 | Petersen et al. | 395/250 |
| 5,367,643 | 11/1994 | Chang et al. | 395/309 |
| 5,371,892 | 12/1994 | Petersen et al. | 395/700 |
| 5,379,296 | 1/1995 | Johnson et al. | 370/60 |
| 5,434,976 | 7/1995 | Tan et al. | 395/200.64 |
| 5,440,690 | 8/1995 | Rege et al. | 395/200.02 |
| 5,566,352 | 10/1996 | Wishneusky | 395/868 |

OTHER PUBLICATIONS

Advanced Micro Devices Product Data Sheets, "An 7990 Local Area Network Controller for Ethernet (LANCE)", pp. 1–19.

*Primary Examiner*—Meng-Ai T. An
*Assistant Examiner*—Walter D. Davis, Jr.
*Attorney, Agent, or Firm*—Lowe, Price, LeBlanc & Becker; Frank D. Nguyen

[57] ABSTRACT

In an interrupt-driven data frame stream receiver, an interrupt to a host processor is applied by an interrupt system that comprises a timer logic circuit, an address match circuit, a data frame counter, a cyclic redundancy check (CRC) logic circuit, a frame length logic circuit, and a frame content detector. Each of these circuits is coupled to an OR gate. A Start Frame Delimiter (SFD) detector is connected to the inputs of the other circuits. The interrupt system provides the interrupts when any one or more of the following conditions arise: 1) a time interval between successive frames in the data frame stream is equal to or greater than a predetermined value, 2) a predetermined maximum number of frames have been received, 3) a frame is not addressed to the receiver, 4) an error frame is received, 5) the length of a frame is less than a minimum preset value, 6) the length of a frame is more than a maximum preset value, 7) frames have been received for a time period that exceeds a predetermined time period, and 8) the content of a frame requests the frame to be handled in a prescribed manner.

46 Claims, 6 Drawing Sheets

The Example Below Shows A Time-out Break In The Packet Sequence

APPARATUS FOR AND METHOD OF PROVIDING INTERRUPTS TO A HOST PROCESSOR IN A FRAME RECEIVING SYSTEM

CROSS-REFERENCE TO RELATED APPLICATIONS

This application is a continuation of Application Ser. No. 08/316,016 filed Sep. 30, 1994, now abandoned, which is a continuation-in-part of Application Ser. No. 08/237,984 filed on May 4, 1994 now abandoned.

TECHNICAL FIELD

The present invention relates generally to data communication systems, and more particularly, to an interrupt-driven system for receiving a stream of data frames or packets.

BACKGROUND ART

In most data communication environments, a number of terminals interact with a master station or central processing unit (CPU) that controls the reception and transmission of data performed by the terminals. For example, FIG. 1 of the drawings illustrates interaction between a host CPU 32 and Intel 82586 LAN controller 34 (coprocessor) in the IEEE 802.3/Ethernet environment. Communication between the host CPU 32 and the controller 34 is carried out via a 82586 system memory 36. The controller comprising a command unit (CU) and receive unit (RU) (not shown in FIG. 1) is engaged in the two types of activities simultaneously: the CU may be fetching and executing commands out of the memory, and the RU may be storing received frames in the memory. CPU intervention is required after the CU executes a command or the RU stores a frame. The CPU and the controller are connected by INTERRUPT and CHANNEL ATTENTION hardware signals. The INTERRUPT signal is used by the controller to inform the CPU as to changes in control and status information. The CHANNEL ATTENTION signal is used by the CPU to inform the controller as to those changes.

Figure 1:
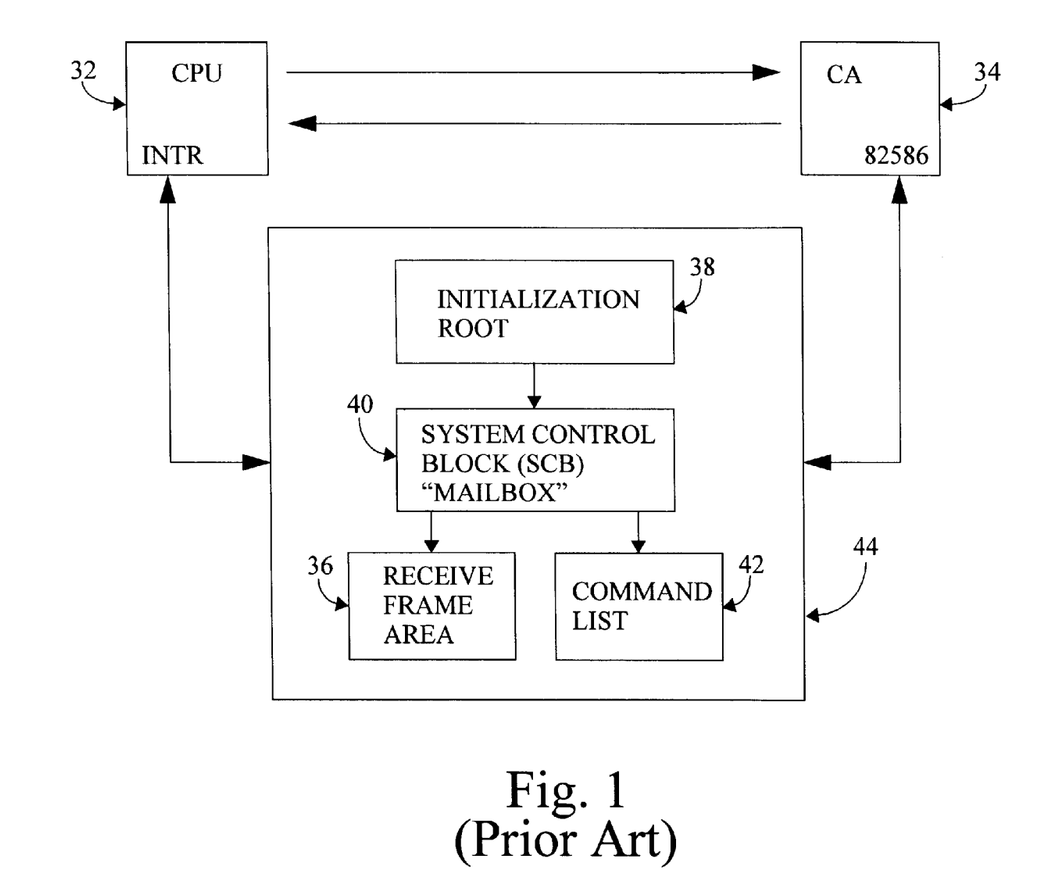
FIG. 1 shows an interaction between the Intel 82586 LAN controller (coprocessor) and host CPU in the IEEE 802.3/ Ethernet environment.

The system memory structure consists of four parts: an initialization root 38, a system control block (SCB) 40, a command list 42 and a receive frame area 36. The initialization root 38 is a predetermined location of the memory space known to both the host CPU 32 and the controller 34, is accessed at initialization and points to the SCB 40. The SCB 40 functions as a bidirectional mail drop between the host CPU 32 and the controller 34 to exchange control and status information. The command list 42 stores a program for the CU. The receive frame area 36 comprises a number of receive buffers and their descriptions. The buffers are filled upon frame reception.

Figure 2:
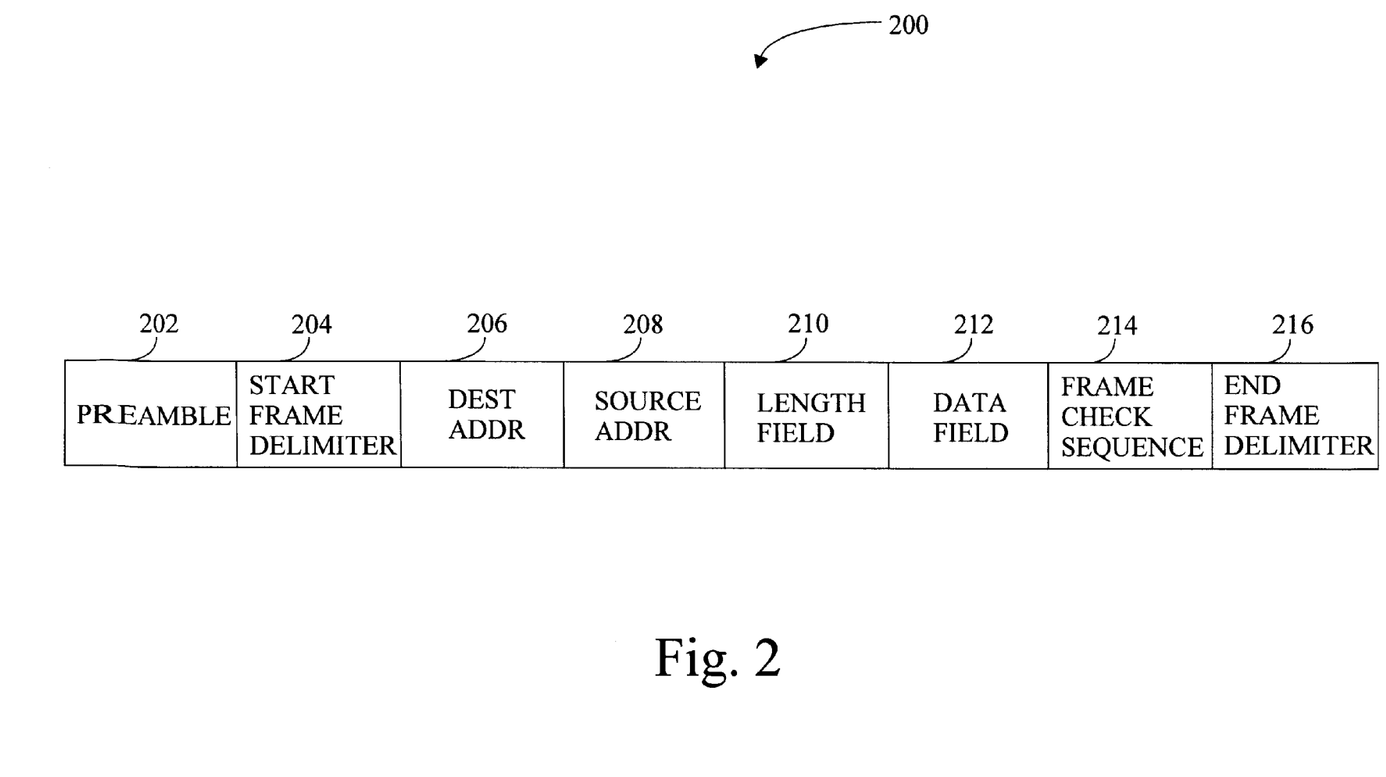
FIG. 2 is a diagram showing a frame format in the Ethernet local area network.

Referring to FIG. 2, an IEEE 802.3 frame/packet 200 comprises a preamble 202 and start frame delimiter (SFD) 204 automatically generated by the LAN controller 34 during transmission and prepended to the frame. The destination address 206, source address 208, length field 210 and data field 212 are supplied by the host CPU 32. The frame check sequence (FCS) 214 is cyclic redundancy check data (CRC) computed by the controller 34 and appended at the end of the frame. The FCS 214 may be followed by the end frame delimiter 216 generated by the controller 34 to indicate the lack of a signal after transmitting the last bit of the FCS 214.

The receive frame area 44 is configured by the host CPU to receive data placed by the controller as frames are received. In order to prepare the receive frame area to receive the next frame, the controller interrupts the CPU upon receiving the entire previous frame. Accordingly, the Intel LAN controller provides an interrupt of the CPU per each received frame.

In another example of interaction between a controller and a master processor, an AM7990 LAN controller that is designed to interface a variety of microprocessors to an IEEE 802.3/Ethernet LAN generates an interrupt to the microprocessor upon the reception of each packet.

The growth in computer applications that require heavy data traffic and the growing availability of high-speed transmission lines creates a need for communication systems able to manage the traffic at much higher rates. However, their throughput is limited by the processing power of master processors that are interrupted upon the reception of each frame or packet. High-speed communication systems may require the master processors to be interrupted at rates 20,000–100,000 interrupts per second. To eliminate processing bottlenecks created by the master processors, it would be desirable to provide a communication system able to receive a contiguous sequence of data frames or packets without interrupting a master processor upon the reception of each frame or packet.

DISCLOSURE OF THE INVENTION

One advantage of the invention is in providing a communication system able to receive a contiguous sequence of data frames or packets without interrupting a master processor upon the reception of each frame or packet.

Another advantage of the invention is in providing a data receiving system that generates interrupts to a master processor in response to predetermined conditions.

A further advantage of the invention is in increasing the processing speed of an interrupt-driven data receiving system by avoiding interruption of a master processor upon the reception of each data frame.

The above and other advantages of the invention are achieved, at least in part, by providing, in an interrupt-driven system for receiving a stream of data items combined in groups having tags for distinguishing one group from another, an apparatus for interrupting a host processor. Tag detecting means detects the tags in response to the received data items. Content detecting means is responsive to the tag detecting means for comparing a plurality of predetermined data items in each of the groups with preset values sequentially. Interrupting means is responsive to the content detecting means for applying an interrupt to the host processor when the content detection means detects that the plurality of the predetermined data items meets prescribed conditions.

In accordance with a preferred embodiment of the invention, each of the groups comprises an Internet Protocol (IP) data frame. The content detecting means determines whether a type of service (TOS) field in the IP data frame is in a non-zero condition. The interrupting means applies the interrupt when the nonzero condition of the TOS field is detected.

In accordance with one aspect of the invention, content detecting means checks the data items in each of the groups to decode a type of the groups and further detects based on the decoded type of the groups which of the data items in each of the groups contains information requesting the groups to be handled in a prescribed manner. The detected data items are compared with the preset values to determine whether the detected data items are in an active condition that requests the groups to be handled in the prescribed manner. The interrupting means applies the interrupt when the detected data items are in the active condition.

In accordance with another aspect of the invention, timer means is provided to compare a time period, during which the groups have been received, with a predetermined programmable value. The interrupting means applies the interrupt when the time period exceeds the programmable value. The timer means is react each time when the interrupt is applied to the host processor.

In accordance with a further aspect of the invention, the timer means is also responsive to the tag detecting means for determining a time interval between successive groups of the stream. The interrupting means generates an interrupt to the host processor when the time interval exceeds a predetermined value.

In accordance with a preferred embodiment of the invention, counting means responsive to the detecting means is provided to determine the number of received groups. The interrupting means is responsive to the counting means for generating the interrupt to the host processor when the number of groups exceeds a predetermined number. Each of the groups may comprise a data frame or a data packet.

The address matching means may check the received data items to detect whether or not the received data items are addressed to the receiving system. The interrupting means applies an interrupt to the host processor when the received data items are not addressed to the receiving system. The counting means may be coupled to the address matching means for determining a number of the groups having the data items addressed to the receiving system. In response to the counting means, the interrupt to the host processor may be applied when this number exceeds a predetermined number.

In accordance with another aspect of the invention, error detecting means may be provided to detect an error group of the data items. The interrupt to the host processor may be applied when the error group is detected.

In accordance with a further aspect of the invention, group length detecting means may be provided to detect a length of each of the groups. The interrupt to the host processor may be applied when this length exceeds a maximum predetermined length or is less than a minimum predetermined length.

The invention may be implemented in the environment of the local area network (LAN) including a host processor and a LAN controller receiving a stream of data frames.

In accordance with the method of this invention, the following steps are carried out. In the interrupt-driven system for receiving a stream of data items combined in groups having tags for distinguishing one group from another, the method provides:

checking the received data items to detect the tags, comparing sequentially a plurality of predetermined data items in each of the groups with preset values, and interrupting the host processor when the plurality of the predetermined data items corresponds to prescribed conditions.

Further, the method may comprise the step of comparing a time period, during which the groups have been received, with a predetermined programmable value. The step of interrupting may be carried out when the time period exceeds the programmable value.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Although the invention has general applicability in the field of data frames (or packets) reception, the best mode for practicing the invention is based in part on the realization that the stream of data frames having the format shown in FIG. 2 are received by a LAN controller that interacts with a host CPU in the Ethernet environment. It is to be understood that the invention is applicable to any interrupt-driven receiver that receives a sequence of recognizable data groups, for example having tags to distinguish one group from another.

Figure 3:
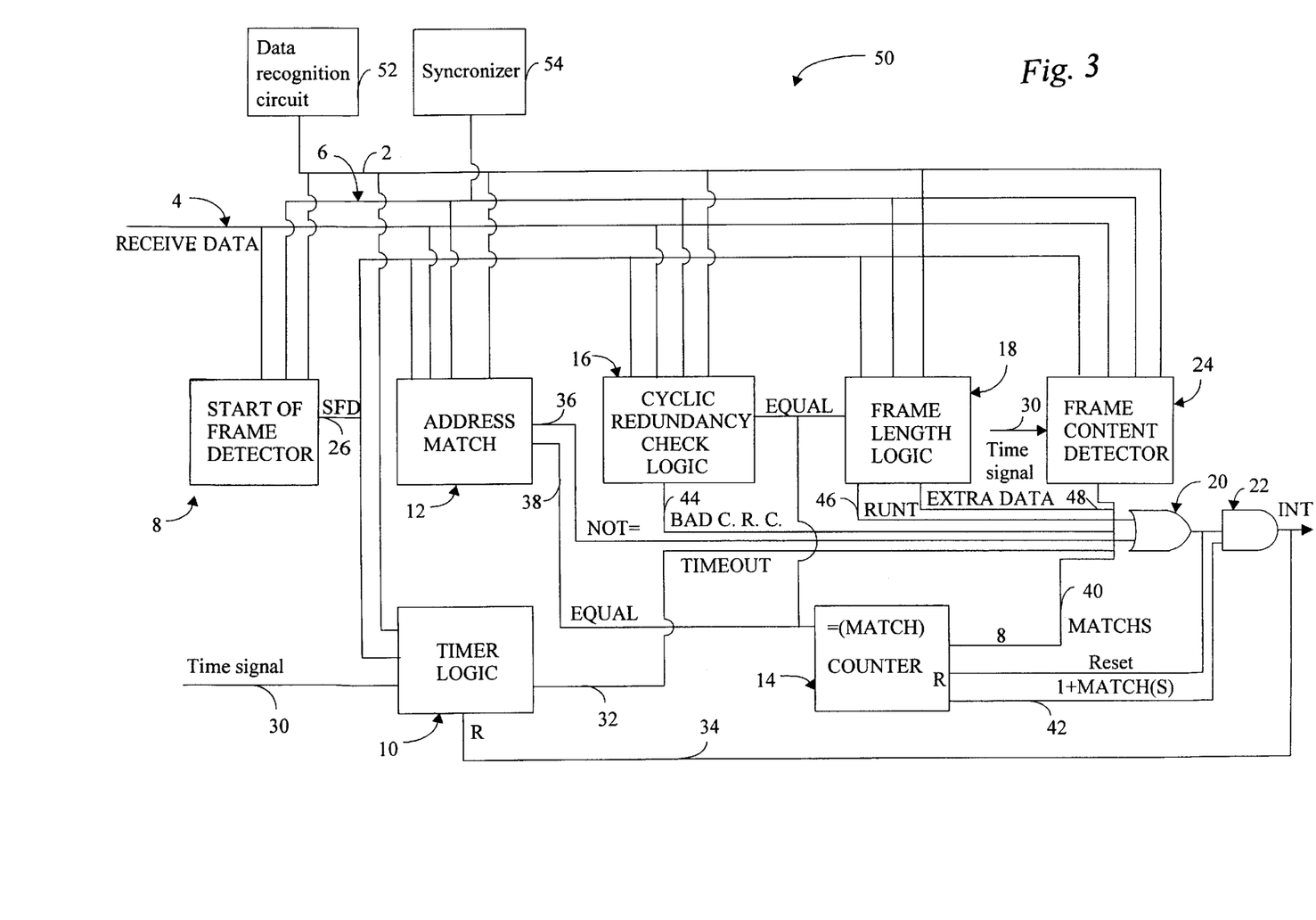
FIG. 3 is a block-diagram illustrating a system for applying interrupts to a host CPU in accordance with the present invention.

With the above background in mind, reference is now made to FIG. 3 of the drawings, wherein the LAN controller comprises a system 50 for applying interrupts to the host CPU. The system 50 comprises a timer logic circuit 10, an address match circuit 12, counter 14, a cyclic redundancy check (CRC) logic circuit 16, a frame length logic circuit 18, and a frame content detector 24. Each of these circuits is coupled to an OR gate 20 that supplies one input of AND gate 22 with an interrupt request signal. The second input of the AND gate 22 receives a qualifying signal level from the counter 14 during the time when one or more address matches are registered by the address match circuit 12. The AND gate 22 generates an interrupt signal supplied to the host CPU. A Start Frame Delimiter (SFD) detector 8 is connected to the inputs of the timer logic circuit 10, address match circuit 12, CRC logic circuit 16, frame length logic circuit 18 and frame content detector 24. The elements of interrupt system 50 are disclosed in more detail later. The system 50 interacts with a data recognition circuit 52 that recognizes the input data as being valid and forms a Data Valid signal supplied to the interrupt system 50 via an input line 2 to inform the system that the Receive Data provided via an input line 4 are valid. For example, the recognition circuit may form the Data Valid signal in response to a sentinel detected in the received data stream. The sentinel may be a single bit or a bit sequence.

An external synchronizer 54 provides the system 50 via input line 6 with a Receive Clock synchronized with the Receive Data. The synchronizer may be combined with the recognition circuit. The Receive Clock 6 may be recovered by the synchronizer 54 from the received data stream, or may be supplied with the received data.

Receive Data signal 4, Receive Clock signal 6 and Data Valid signal 2 are supplied to the SFD detector 8 to detect the SFD field 204 of the frame shown in FIG. 2 to provide the system 50 with a SFD signal indicating beginning of a frame in the received data stream. In the Ethernet environment, the SFD field 204 contains the 10101011 flag.

Figure 4:
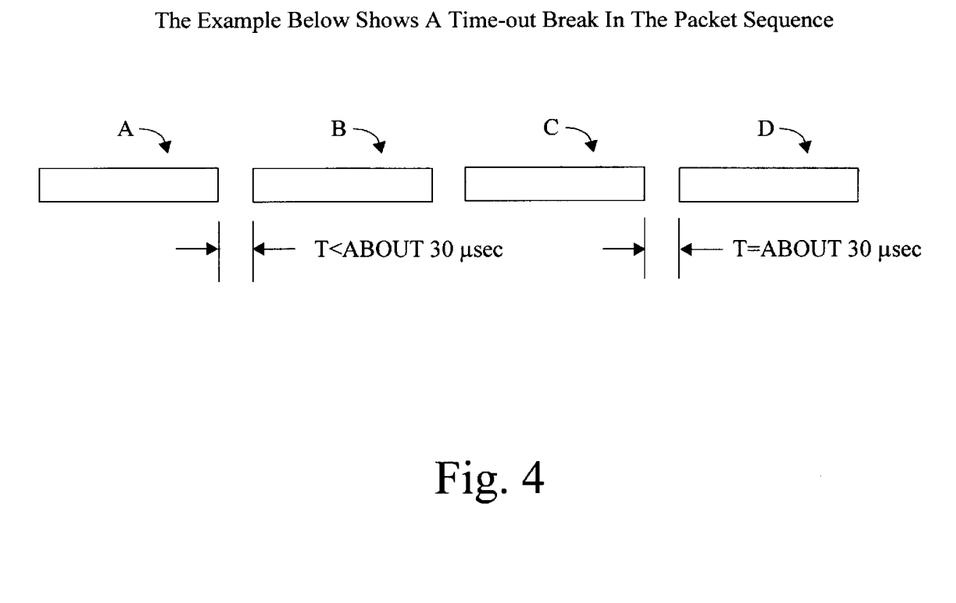
FIG. 4 illustrates an example of a time-out break in a frame sequence.

A timer logic circuit 10 receives SFD signal 26, together with Data Valid signal 2 and an external Time signal 30 to calculate a time-out break T in the frame sequence. An example of the time-out breaks T in the sequence of frames A, B, C and D is shown in FIG. 4. When is the timer logic circuit 10 determines that the next received frame D starts at a time greater than or equal to 30 $\mu$sec after ending of the previous frame C, Timeout signal 32 is supplied to the OR gate 20 that generates the interrupt request signal. The transition of the Data Valid signal 2 may be used to indicate the ending of the previous frame. Hence, the interrupt system according to the present invention applies an interrupt to the host processor when a time interval between two successive frames (for example, between the frames C and D in FIG. 4) in a frame sequence is greater than or equal to a predetermined value (for example, 30 $\mu$sec), and does not interrupt the host processor when time intervals between successive frames (for example, between the frames A and B or B and C in FIG. 4) are less than the predetermined value.

Figure 5:
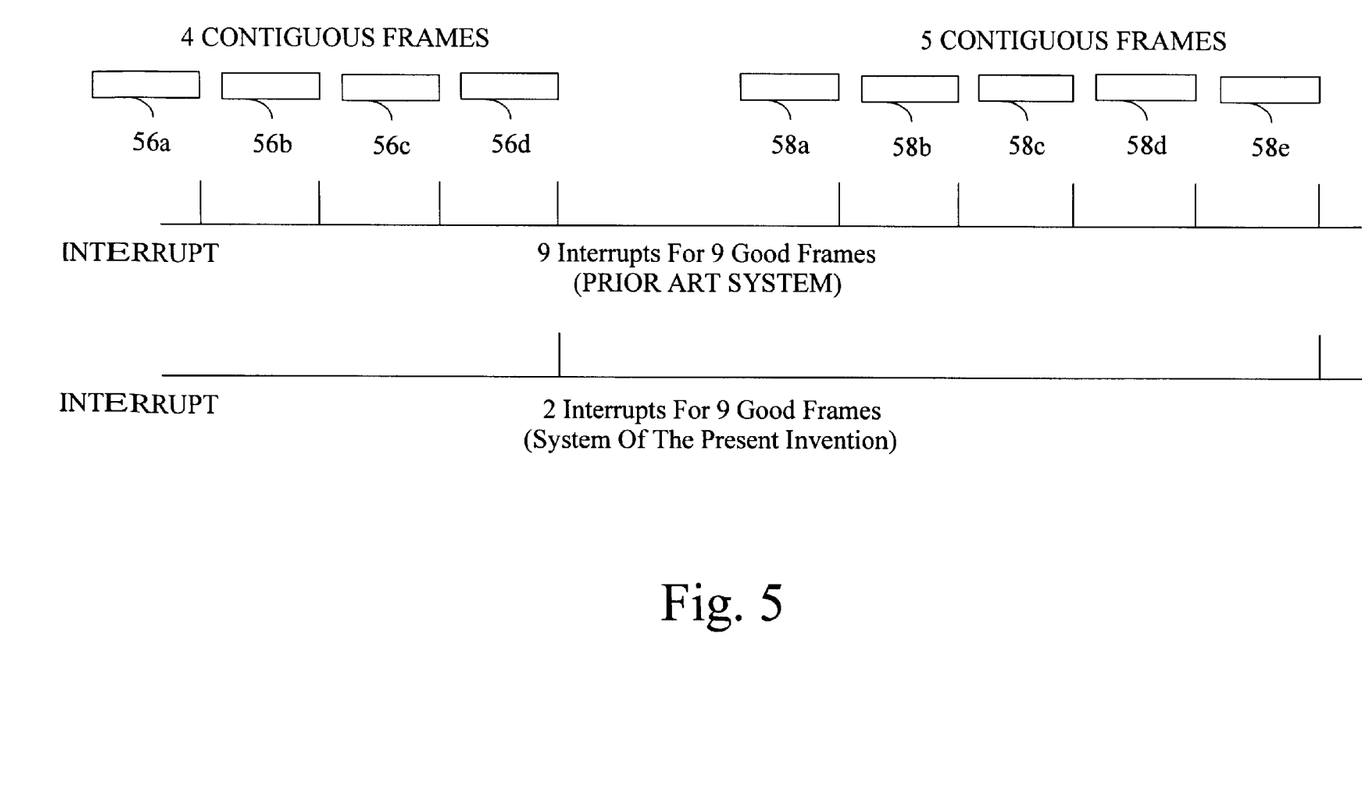
FIG. 5 shows an example that compares the prior art interrupt system with the system of the present invention.

An advantage of the interrupt system of the present invention over the prior art interrupt system is illustrated by an example shown in FIG. 5, wherein a receiver is provided with a sequence of four contiguous frames 56a–56d followed by another sequence of five contiguous frames 58a–58e. While the prior art interrupt system causes a host CPU to be interrupted nine times for nine good frames, the system according to the present invention generates only two interrupts for the same number of good frames.

Further, the timer logic circuit 10 provides time measurement to initiate data processing when a preset volume of information has been received after the last interrupt, based on the measured time. A first one of the Data Valid signal transitions starts the timer 10 that is reset by each interrupt signal supplied through a feedback loop 34. The timer logic circuit 10 is provided with a programmable input value that defines a predetermined time period, after which the timer 10 supplies the OR gate 20 with a time-based signal requesting the host CPU to be interrupted. For example, the time-based interrupt may be generated if information has been received without interruptions for 8 msec.

The address match circuit 12 is supplied with the Receive Data 4, Receive Clock 6, Data Valid 2 and SFD 26 signals to determine whether or not the received frame stream is addressed to the LAN controller (or to other data receiver containing the interrupt system 50). The address match circuit 12 may be in the form of a destination address filter known in the art. If the address of the received data does not match the receiver address, the address match circuit 12 provides the OR gate 20 with a Not EQUAL signal 36 to generate the interrupt signal INT to the host CPU.

If the data destination address corresponds to the receiver address, the address match circuit 12 supplies an Address Match signal 38 (EQUAL) to the counter 14 that counts these signals to determine the number of the received frames having the address matching the receiver address. When the count of the counter 14 reaches a preset maximum number (for example, 8), a count signal MATCHS 40 is supplied to the OR gate 20 to generate the interrupt request signal at its output coupled to one of the inputs of the AND gate 22. The second input of the AND gate 22 is supplied by the counter 14 with a qualifying logic signal 1+MATCH(S) 42 that represents a logic level during the interval from the first address match until reset, when one or more address matches are registered by the address match circuit 12 after an interrupt. The counter 14 is reset by any one of the interrupt request signals generated by the OR gate 20.

To detect an error frame, Receive Data 4, Receive Clock 6, Address Match 38, SFD 26 and Data Valid 2 signals are supplied to the CRC logic circuit 16. If a frame in the received stream contains ail error in the CRC data of the FCS field shown in FIG. 2, the CRC logic circuit 16 supplies the OR gate 20 with a Bad CRC signal 44 to generate the interrupt request signal.

The frame length logic circuit 18 is supplied with SFD 26, Address Match 40 and Data Valid 2 signals and Receive Clock 2 to determine whether or not a length of a frame in the received stream is within the limits acceptable for the receiver. For example, in the Ethernet environment, the length of each frame must be between 64 bytes and 1518 bytes. If the frame length logic circuit 18 determines that the frame length is less than 64 bytes, it supplies the OR gate 20 with a Runt signal 46 to form the interrupt request signal. If the frame length is determined to be more than 1518 bytes, the frame length logic circuit 18 forms an Extra data signal 48 that causes the OR gate 20 to generates the interrupt request signal. SFD signal 26 is used to indicate the beginning of the frame. The transition of the Data Valid signal 2 is used to indicate the end of the frame. Hence, the interrupt system according to the invention interrupts the host CPU if the length of the received frame is less than a minimum predetermined value or more than a maximum predetermined value.

Valid Data 2, Receive Clock 6, Receive Data 4, SFD 26 and Time 30 signals are also supplied to the frame content detector 24 that provides the interruption of the host CPU on the frame content basis. Some types of frame formats contain fields that require the corresponding frames to be handled in a prescribed manner. In particular, the Internet Protocol (IP) frames have a type of service (TOS) field that denotes precedence, low delay, high throughput or high reliability request. In the IEEE 802.3 frame shown in FIG. 2, byte 22 of the data field is a TOS byte, bytes 19 and 20 represent a type of packet. Type of packet bytes are decoded to determine which of the frame bytes denotes a type of service.

Figure 6:
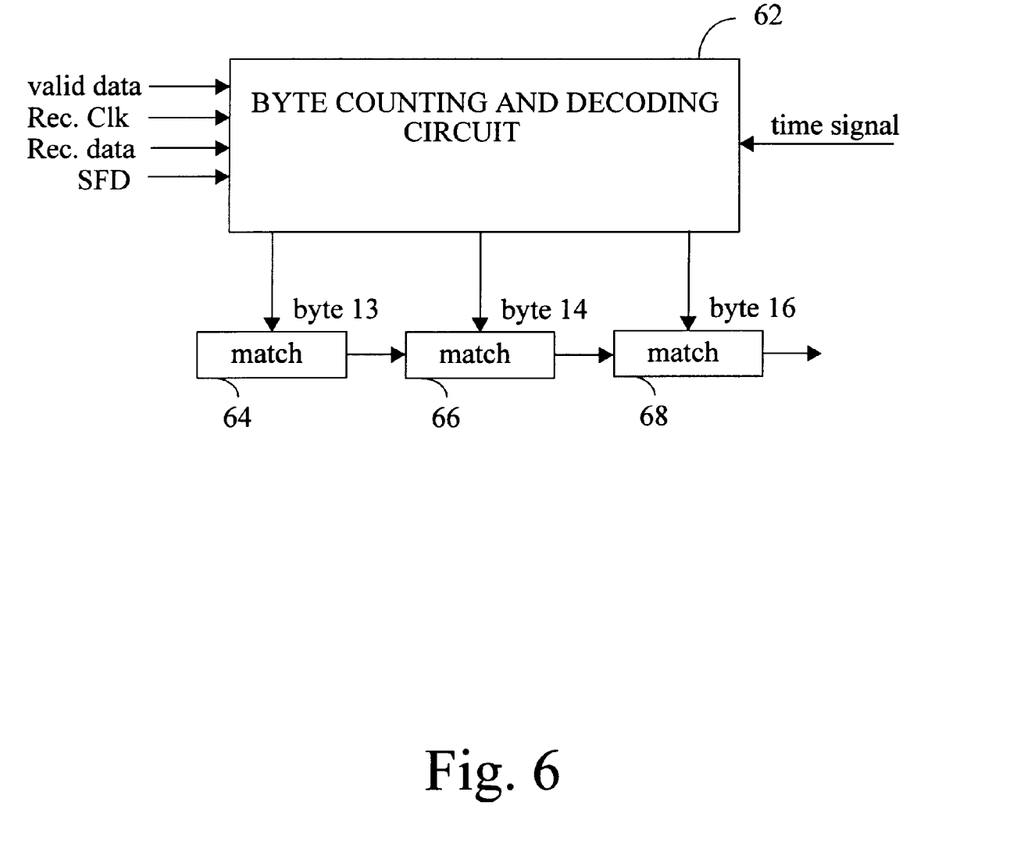
FIG. 6 illustrates an example of the frame content detector shown in FIG. 3.

Referring to FIG. 6, an example of the frame content detector 24 is based in part on the realization that IP Ethernet II type frames are received that have bytes 13 and 14 denoting a type of frames and byte 16 specifying a type of service. The frame content detector may be implemented by a sequential state machine 60 comprising a byte counting and decoding circuit 62 that receives the input signals supplied to the frame content detector to monitor the byte position in the frame and select bytes 13, 14 and 16. The selected bytes 13, 14 and 16 are respectively supplied to 8-bit match circuits 64, 66 and 68 that subsequently compare them with programmable predetermined values stored therein.

In particular, the match circuit 64 compares byte 13 with value 00. If a match is detected, then the match circuit 66 compares byte 14 with value 08. If both of the matches are registered, it indicates that the received frame is an IP Ethernet II type frame. In this case, the match circuit 68 compares TOS byte 16 with 00. If the TOS byte is zero, it indicates that a routine frame is received. However, non-zero values of the TOS byte denote precedence, low delay, high throughput or high reliability request.

Accordingly, if the match circuit 68 detects no match condition, an interrupt request signal is supplied to OR gate 20 to interrupt the host CPU and provide handling of the received frame in a prescribed manner. If any of the match circuits 64 and 66 registers no match condition, or the match circuit 68 detects the match condition, no interrupt is requested.

As discussed above, the OR gate 20 is coupled to one input of the AND gate 22 having its second input supplied with a qualifying signal level during the time when one or more address matchs after an interrupt are registered by the address match circuit 12 to generate the interrupt signal to the host CPU.

There accordingly has been described a system for generating interrupts to a host CPU in a data frame stream receiver that does not interrupt the host CPU upon the reception of each frame. The interrupt system provides the interrupts when:

1) a time interval between successive frames in the data frame stream is greater than or equal to a predetermined value, 2) a predetermined maximum number of frames have been received, 3) a frame is not addressed to the receiver, 4) an error frame is received, 5) the length of a frame is less than a minimum preset value, 6) the length of a frame is more than a maximum preset value, 7) frames have been received for a time period that exceeds a predetermined time period, or 8) the content of a frame requests the frame to be handled in a prescribed manner.

Accordingly, the disclosed interrupt system allows host CPUs to be interrupted in response to predetermined conditions, rather than upon the reception of each frame in a frame stream, in order to eliminate processing bottlenecks created by the host CPUs and to increase throughput of communication networks.

In this disclosure, there are shown and described only the preferred embodiments of the invention, but it is to be understood that the invention is capable of changes and modifications within the scope of the inventive concept as expressed herein.

I claim:

1. In an interrupt-driven system for receiving a sequence of data frames having tags for distinguishing one frame from another, an apparatus for providing interrupts to a host processor comprising:

a tag detector responsive to a received sequence of data frames for detecting said tags, a content detector responsive to said tag detector for sequentially comparing data items with preset values to detect a data frame of a predetermined type in said sequence, said content detector including first match circuit for comparing at least a first predetermined data item with a corresponding predetermined value, and second match circuit for comparing a second predetermined data item with a second predetermined value only if said first predetermined data item matches the first predetermined value, and an interrupt generator responsive to said content detector for providing an interrupt to said host processor when the second predetermined data item does not match the second predetermined value and for preventing the interrupt from being provided to the host processor when the second predetermined data item matches the second predetermined value thereby reducing number of interrupts to said host processor.

2. The apparatus of claim 1, wherein each of said data frames comprises an Internet Protocol (IP) data frame.

3. The apparatus of claim 2, wherein said content detector determines whether a type of service (TOS) field in the IP data frame is in a non-zero condition.

4. The apparatus of claim 3, wherein said interrupt generator applies the interrupt when the non-zero condition of the TOS field is detected.

5. The apparatus of claim 1, wherein said content detector checks the data items in each of the data frames to decode a type of the data frames.

6. The apparatus of claim 5, wherein said content detector further detects, based on the decoded type of the data frames, which of the data items in each of the data frames contains information requesting the groups to be handled in a prescribed manner.

7. The apparatus of claim 6, said content detector compares the detected data items with the preset values to determine whether the detected data items are in a first condition that specifies the data frames be specified in the prescribed manner.

8. The apparatus of claim 7, wherein said interrupt generator applies the interrupt when the detected data items are in said first condition.

9. The apparatus of claim 1, further comprising a timer which compares a time period, during which said data frames have been received, with a predetermined programmable value.

10. The apparatus of claim 9, wherein said interrupt generator applies the interrupt when said time period exceeds said programmable value.

11. The apparatus of claim 9, wherein said timer is reset each time an interrupt is applied to said host processor.

12. In a local area network (LAN) including a host processor and a LAN controller receiving a sequence of data frames, a system for providing interrupts to said host processor comprising:

a frame detector for detecting received frames;

a content detector responsive to said frame detector for sequentially comparing bytes of said frame to detect a data frame of a predetermined type in said sequence;

said content detector comprising a first match circuit for comparing at least one predetermined byte of each of said frames with a corresponding predetermined value, and second match circuit for comparing a second predetermined byte of each of said frames with a second predetermined value only if said first predetermined byte matches the first predetermined value, and;

an interrupt generator coupled to said content detector for providing an interrupt to said host processor when the second predetermined byte does not match the second predetermined value, and for preventing the interrupt from being provided when the second predetermined byte matches the second predetermined value thereby reducing number of interrupts to said host processor.

13. The system of claim 12, wherein said content detector decodes type bytes that indicate a type of the received frames.

14. The system of claim 13, wherein said content detector decodes a type of service (TOS) byte in the frames based on the detected type of the frames.

15. The system of claim 14, wherein said content detector checks the TOS byte to detect whether it requires a received frame to be handled in a prescribed manner.

16. The system of claim 15, wherein an interrupt is applied when the TOS byte requires the received frame to be handled in the prescribed manner.

17. The system of claim 12 further comprising a destination address filter coupled to said frame detecting circuit for detecting whether or not said received frames are addressed to said LAN controller.

18. The system of claim 17, wherein said interrupt generator is coupled to said destination address filter to apply the interrupt to said host processor when any one of said received frames is not addressed to said LAN controller.

19. The system of claim 17, further comprising a counter coupled to said destination address filter to determine a number of received frames addressed to said LAN controller.

20. The system of claim 19, wherein said interrupt generator applies the interrupt to said host processor when said number exceeds a predetermined number.

21. The system of claim 12 further comprising an error detector responsive to said sequence of data frames for detecting an error frame.

22. The system of claim 21, wherein said interrupt generator is coupled to said error detector for applying an interrupt to said host processor when said error frame is detected.

23. The system of claim 12 further comprising a group length detector responsive to said sequence of data frames for detecting a length of each of said data frames.

24. The system of claim 23, wherein said interrupt generator is coupled to said group length detector for applying an interrupt to said host processor when said length exceeds a maximum predetermined length.

25. The system of claim 23, wherein said interrupt generator is coupled to said group length detector for applying an interrupt to said host processor when said length is less than a minimum predetermined length.

26. The system of claim 12 further comprising a timer coupled to said frame detector for determining a time interval between successive frames of said sequence of data frames.

27. The system of claim 26, wherein said interrupt generator is coupled to said timer to apply an interrupt to said host processor when said time interval exceeds a preset value.

28. The system of claim 26, wherein said timer circuit further determines a time period elapsed since a previous interrupt to said host processor.

29. The system of claim 28, wherein said interrupt generator is responsive to said timer to apply an interrupt to said host processor when said time period exceeds a programmable predetermined value.

30. In an interrupt-driven system for receiving a sequence of data frames having tags for distinguishing one data frame from another, a method of providing interrupts to a host processor comprising the steps of:
checking the received sequence to detect said tags,
comparing at least a first predetermined data item in each of the data frames with a corresponding predetermined value,
then only if the first predetermined data item matches the first predetermined value, comparing a second predetermined data item in each of the data frames with a second predetermined value,
sending a request for interrupting said host processor, if the second predetermined data item does not match the second predetermined value, and
preventing the request from being sent, if the second predetermined data item matches the second predetermined value thereby reducing number of interrupts to said host processor.

31. The method of claim 30, wherein the step of comparing further comprises checking received data items to decode a type of the data frame.

32. The method of claim 31, wherein the step of comparing further comprises detecting, based on a decoded type of the data frame, which of the data items in each of the data frames contains information requesting the groups to be handled in a prescribed manner.

33. The method of claim 32, wherein the step of comparing further comprises comparing detected data items with preset values to determine whether the detected data items are in first condition that specifies the data frame be handled in the prescribed manner.

34. The method of claim 33, wherein the step of interrupting is carried out when detected data items are in the first condition.

35. The method of claim 30, further comprising the step of comparing a time period, during which said sequence has been received, with a predetermined programmable value.

36. The method of claim 35, wherein said step of sending the request is carried out when said time period exceeds said programmable value.

37. In a computer system including a storage area for storing a stream of data frames received by said computer system, an interrupt system for providing interrupts to a processor in said computer system when said stream of data frames are received, said interrupt system comprising:
a matching circuit for determining whether each of said data frames is addressed to said computer system;
a counter coupled to said matching circuit for generating a qualifying signal when said matching circuit detects a first of the data frames addressed to said computer system;
a timer for determining a time interval since reception of a last of the data frames in the stream, and
an interrupt generator coupled to said counter and to said timer circuit for sending an interrupt signal to said processor when said time interval exceeds a predetermined value and if said qualifying signal is generated thereby reducing number of interrupts to said host processor,
said counter being reset by said interrupt signal to stop generating said qualifying signal.

38. The interrupt system of claim 37, wherein said counter counts a number of data frames addressed to said computer system, and said interrupt generator sends an interrupt to said processor when said number of the data frames exceeds a predetermined number, if said qualifying signal is generated.

39. The interrupt system of claim 38, further comprising an error detector for detecting an error in receiving said data frames.

40. The interrupt system of claim of claim 39, wherein said interrupt generator sends said interrupt signal to said processor in response to detection of said error, if said qualifying signal is generated.

41. The interrupt system of claim 37, further comprising a length detecting circuit for detecting a length of each of said data frames.

42. The interrupt system of claim of claim 37, wherein said interrupt generator sends said interrupt signal to said processor if a frame length exceeds a maximum predetermined length, and said qualifying signal is generated.

43. The interrupt system of claim of claim 41, wherein said interrupt generator sends said interrupt signal to said processor if said length is less than a minimum predetermined length, and said qualifying signal is generated.

44. The interrupt system of claim 37, wherein said matching circuit determines whether a data frame is addressed to said computer system by comparing an address in each data frame to at least one address.

45. The interrupt system of claim 44, wherein said interrupt generator sends said interrupt signal to said processor if any of said data frames is not addressed to said computer system, and said qualifying signal is generated.

46. The interrupt system of claim 37, further comprising a destination address filter coupled between said matching circuit and said counter for detecting whether said received data items are addressed to said computer system.

* * * * *